(12) United States Patent
Jeon et al.

(10) Patent No.: US 7,989,737 B2
(45) Date of Patent: Aug. 2, 2011

(54) STEAM GENERATOR AND HEATING COOKING APPARATUS HAVING THE SAME

(75) Inventors: Ki Suk Jeon, Seongnam-si (KR); Kobayashi Shozo, Suwon-si (KR); Seok Weon Hong, Yongin-si (KR); Jong Chull Shon, Suwon-si (JP); Hyang Ki Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1085 days.

(21) Appl. No.: 11/808,752

(22) Filed: Jun. 12, 2007

(65) Prior Publication Data
US 2008/0078755 A1    Apr. 3, 2008

(30) Foreign Application Priority Data
Sep. 28, 2006   (KR) ........................ 10-2006-0094861

(51) Int. Cl.
| | |
|---|---|
| A47J 37/00 | (2006.01) |
| F24C 7/06 | (2006.01) |
| A21B 1/24 | (2006.01) |
| A21B 3/04 | (2006.01) |
| H05B 3/30 | (2006.01) |

(52) U.S. Cl. ........... 219/401; 126/20; 392/402; 392/399
(58) Field of Classification Search ........................ None
See application file for complete search history.

(56) References Cited

U.S. PATENT DOCUMENTS

| | | | | |
|---|---|---|---|---|
| 3,774,008 | A | * | 11/1973 | Maniscalco .................... 219/401 |
| 4,373,430 | A | * | 2/1983 | Allen ............................... 99/468 |
| 4,578,563 | A | * | 3/1986 | Eguchi et al. ................. 392/403 |
| 4,724,824 | A | * | 2/1988 | McCoy et al. ................ 392/396 |
| 4,851,644 | A | * | 7/1989 | Oslin ............................ 219/400 |
| 6,441,347 | B1 | * | 8/2002 | Wu ................................ 219/438 |
| 7,669,591 | B2 | * | 3/2010 | Fossati et al. ................. 126/348 |

(Continued)

FOREIGN PATENT DOCUMENTS

EP    0 821 096    1/1998

(Continued)

OTHER PUBLICATIONS

Office Action issued Nov. 7, 2008 in corresponding Chinese Patent Application No. 200710112247.2.

*Primary Examiner* — Joseph M Pelham
(74) *Attorney, Agent, or Firm* — Staas & Halsey LLP (57) ABSTRACT

A heating cooking apparatus including a body, a steam container, a steam heater, and a heater covering portion. The body has a cooking compartment in which food is disposed. The steam container includes a chamber, a water supply portion to supply water into the chamber, and a steam discharge portion to discharge steam generated in the chamber into the cooking compartment. The steam heater has a chamber bottom forming portion that is coupled to a lower end of the steam container so as to cover a bottom of the chamber and adapted to heat water supplied into the chamber. The heater covering portion is configured to cover a rim of the steam heater. Covering the rim of the steam heater using the heater covering portion alleviates the risk of power leakage accidents caused when water at the outside of a steam generator comes into contact with the steam heater.

12 Claims, 4 Drawing Sheets

U.S. PATENT DOCUMENTS

| | | | |
|---|---|---|---|
| 7,759,615 B2 * | 7/2010 | Ando et al. | 219/401 |
| 2006/0096970 A1 * | 5/2006 | Yang et al. | 219/401 |
| 2006/0237428 A1 * | 10/2006 | Cho et al. | 219/401 |
| 2007/0138160 A1 * | 6/2007 | Ando et al. | 219/401 |
| 2009/0250452 A1 * | 10/2009 | Tse | 219/401 |

FOREIGN PATENT DOCUMENTS

| | | |
|---|---|---|
| EP | 1 658 798 | 5/2006 |
| JP | 2005-337627 | 12/2005 |
| KR | 2005-68482 | 7/2005 |

* cited by examiner

STEAM GENERATOR AND HEATING COOKING APPARATUS HAVING THE SAME

CROSS-REFERENCE TO RELATED APPLICATIONS

This application claims the benefit of Korean Patent Application No. 2006-0094861, filed on Sep. 28, 2006 in the Korean Intellectual Property Office, the disclosure of which is incorporated herein by reference.

BACKGROUND OF THE INVENTION

1. Field of the Invention

The present invention relates to a steam generator and a heating cooking apparatus having the same, and, more particularly, to a steam generator capable of preventing power leakage of a steam heater that is used to generate heat when electric power is applied thereto, and a heating cooking apparatus having the steam generator.

2. Description of the Related Art

Examples of general heating cooking apparatuses used to cook food include a microwave oven using a high frequency, and a gas oven and an electric oven designed to directly apply heat to food using a heater. Of the above mentioned heating cooking apparatuses, the microwave oven has a great limit in the kind of food allowed to be cooked thereby and suffers from deterioration in the taste of the cooked food because it causes excessive drying of the food. Also, the gas oven and the electric oven have problems of excessively long cooking time and low cooking efficiency because they use air having a relatively low density as a heat transfer medium between the heater and food to be cooked.

Recently, as a solution of compensating for the above described problems of the conventional heating cooking apparatuses, a novel heating cooking apparatus (hereinafter, referred to as "steam oven") has been developed. The steam oven is designed to heat food using steam. When cooking food using the steam oven, it is possible to maintain an appropriate amount of moisture in food and consequently, maintain original taste of food. Also, steam filling up a cooking compartment of the oven acts as an efficient heat transfer medium, resulting in a reduction in cooking time.

The steam oven generally includes a steam generator to generate and supply steam by heating water, and a water supply device to supply water into the steam generator. The steam generator includes a steam container to provide a steam generation space therein, and a steam heater to heat water supplied into the steam container. The water supply device includes a water vessel and a water supply pump to transfer water stored in the water vessel into the steam container. A steam supply tube is interposed between the steam container and the cooking compartment, to supply the steam generated in the steam container into the cooking compartment therethrough.

However, in consideration of the fact that the steam oven uses water, the steam oven should be designed to prevent power leakage, so as prevent a variety of electronic elements from coming into contact with water. In particular, since the steam heater, which is operated upon receiving electric power, is located adjacent to the steam container into which water is supplied, it is important to prevent a terminal of the steam heater from coming into contact with water.

SUMMARY OF THE INVENTION

The present invention has been made in order to solve the above problems. It is an aspect of the invention to provide a steam generator capable of preventing water from coming into contact with a terminal of a steam heater that is used to heat the water when electric power is applied thereto, and a heating cooking apparatus having the same.

Consistent with one aspect, an exemplary embodiment of the present invention provides a steam generator including: a steam container having a chamber, a water supply portion to supply water into the chamber, and a steam discharge portion to discharge steam generated in the chamber; a steam heater having a chamber bottom forming portion that is coupled to a lower end of the steam container so as to cover a bottom of the chamber and adapted to heat the water supplied into the chamber; and a heater covering portion configured to cover a rim of the steam heater.

The heater covering portion may be extended from the lower end of the steam container.

The steam heater may include: a heating plate including the chamber bottom forming portion configured to cover the lower end of the steam container; and a heating element coupled to a lower surface of the heating plate and adapted to generate heat when electric power is applied thereto.

The heating plate may include an extension formed around a periphery of the chamber bottom forming portion, and the heater covering portion includes: a top covering portion to cover an upper surface of the extension and a rim covering portion to cover a rim of the extension.

The heating plate may have a drain hole perforated in a side position thereof, and a drain guiding member having a drain pipe is coupled to a lower side of the heating plate, so as to allow the water passed through the drain hole to be discharged through the drain pipe.

Consistent with another aspect, an exemplary embodiment of the present invention provides a steam generator including: a steam container having a chamber, a water supply portion to supply water into the chamber, and a steam discharge portion to discharge steam generated in the chamber into a cooking compartment; and a steam heater having a chamber bottom forming portion that is coupled to a lower end of the steam container so as to cover the chamber and adapted to heat the water supplied into the chamber and a terminal for the supply of power, wherein the chamber bottom forming portion of the steam heater is located lower than the terminal of the steam heater.

The steam heater may have a planar shape and is installed to the steam container to have a tilt angle so that the chamber bottom forming portion is located lower than the terminal.

Consistent with a further aspect, an exemplary embodiment of the present invention provides a heating cooking apparatus including: a body having a cooking compartment in which food is disposed; a steam container having a chamber, a water supply portion to supply water into the chamber, and a steam discharge portion to discharge steam generated in the chamber into the cooking compartment; a steam heater having a chamber bottom forming portion that is coupled to a lower end of the steam container so as to cover a bottom of the chamber and adapted to heat the water supplied into the chamber; and a heater covering portion configured to cover a rim of the steam heater.

Consistent with yet another aspect, an exemplary embodiment of the present invention provides a heating cooking apparatus including: a body having a cooking compartment in which food is disposed; and a steam generator including: a steam container having a chamber, a water supply portion to supply water into the chamber, and a steam discharge portion to discharge steam generated in the chamber into the cooking compartment; and a steam heater having a chamber bottom forming portion that is coupled to a lower end of the steam container and adapted to heat the water supplied into the chamber, wherein the steam generator is installed to the body to have a tilt angle so that one end of the steam heater having a power supply terminal is located higher than the other end of the steam heater.

The steam container may include at least one coupling member protruded from a side surface thereof, and the steam generator is installed to the body to have a tilt angle as the coupling member is coupled to a side surface of the body.

The coupling member of the steam container may have a screw hole into which a coupling screw is inserted, and the body has a coupling hole corresponding to the screw hole, whereby the steam generator is screwed to the body.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the exemplary embodiments of the invention will become apparent and more readily appreciated from the following description of the embodiments, taken in conjunction with the accompanying drawings, of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to like elements throughout. The embodiments are described below to explain the present invention by referring to the figures.

Figure 1:
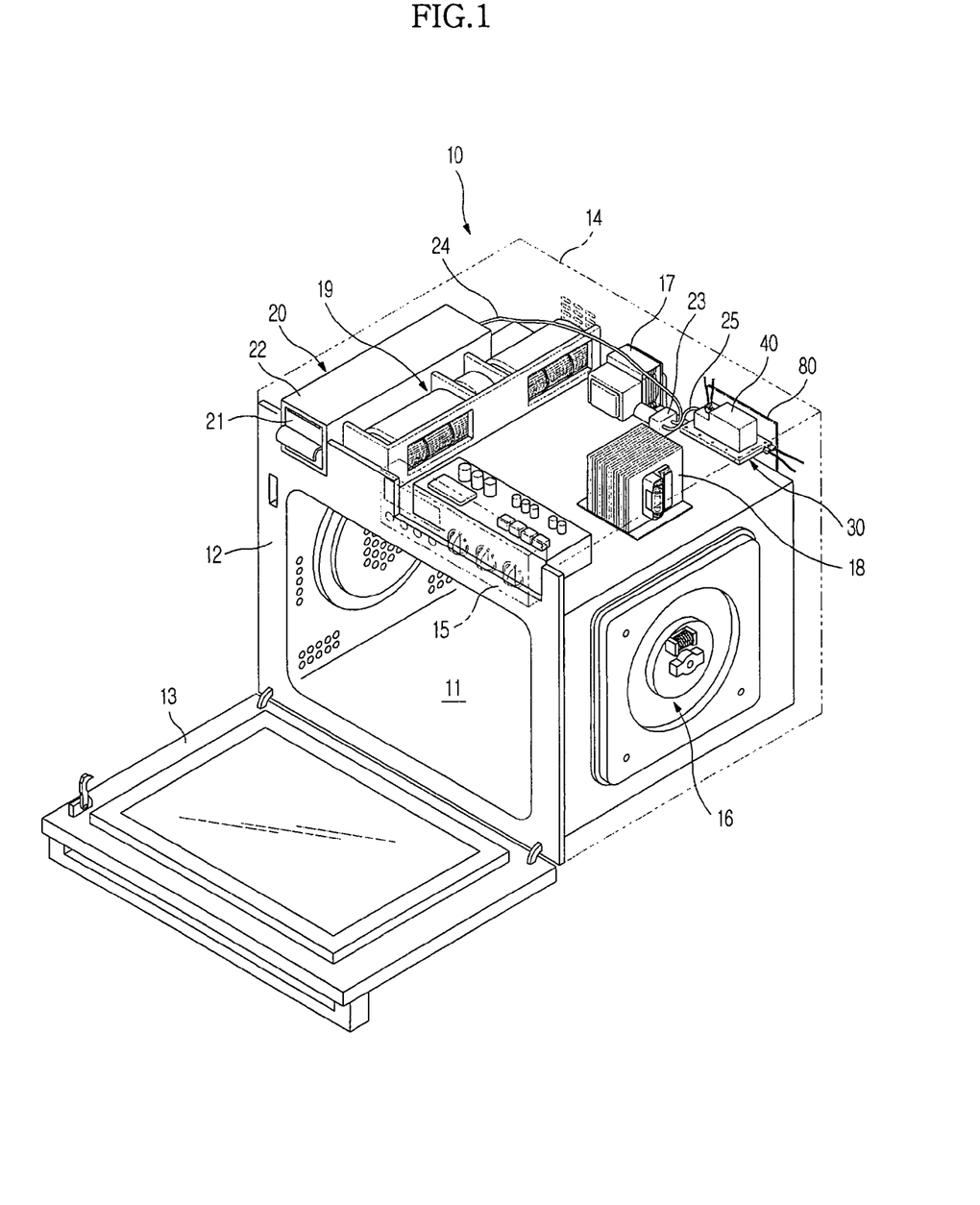
FIG. 1 is a perspective view schematically showing a heating cooking apparatus consistent with an embodiment of the present invention.
Figure 2:
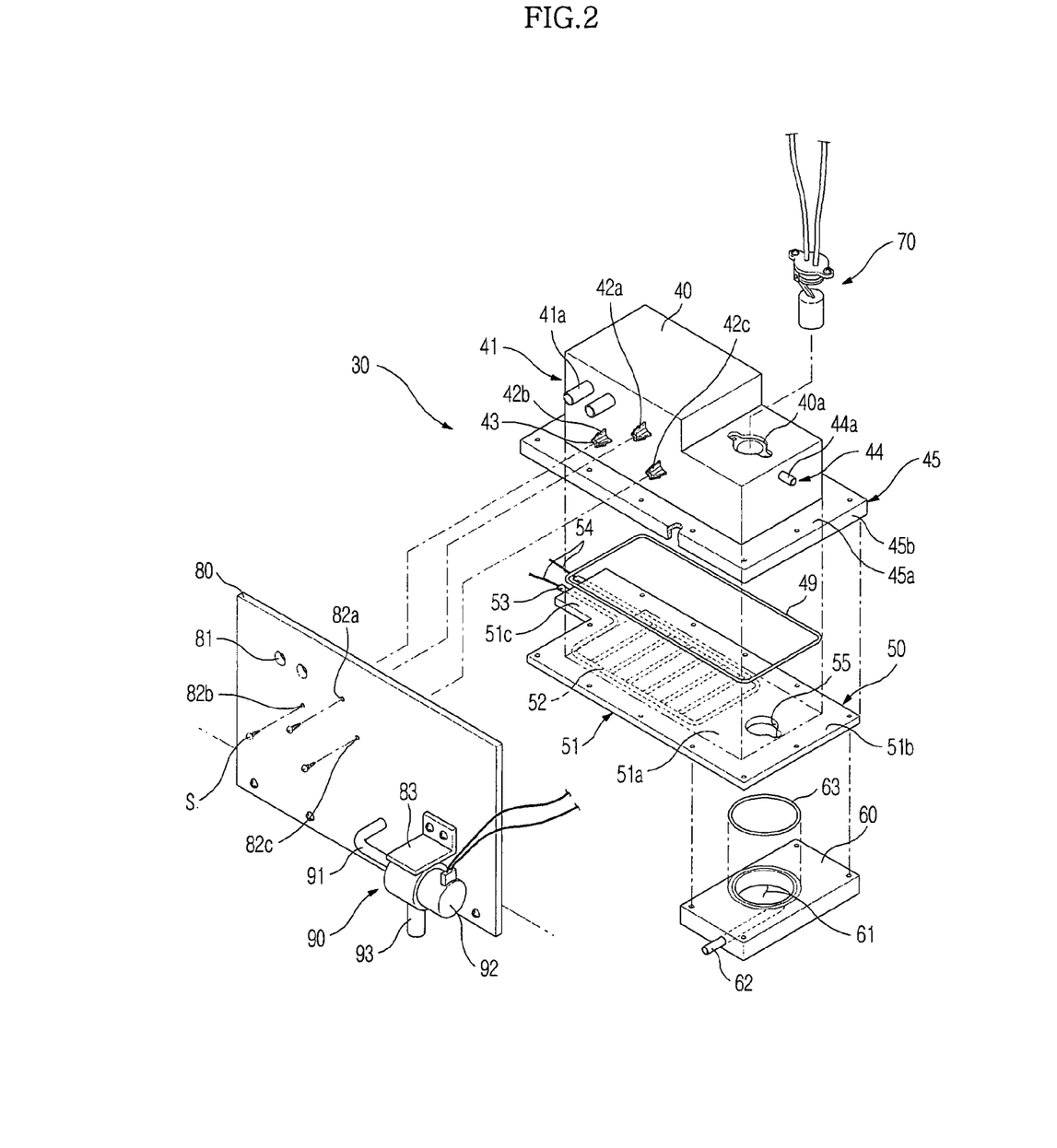
FIG. 2 is a perspective view schematically showing a steam generator consistent with the embodiment of the present invention.
Figure 3:
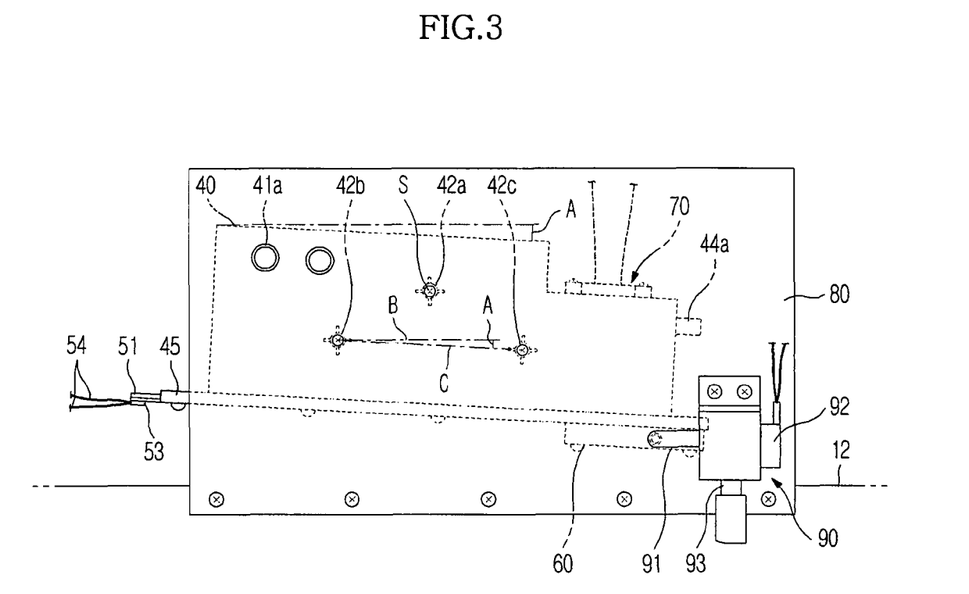
FIG. 3 is a view showing a coupling structure between the steam generator and a body of the heating cooking apparatus consistent with the embodiment of the present invention.
Figure 4:
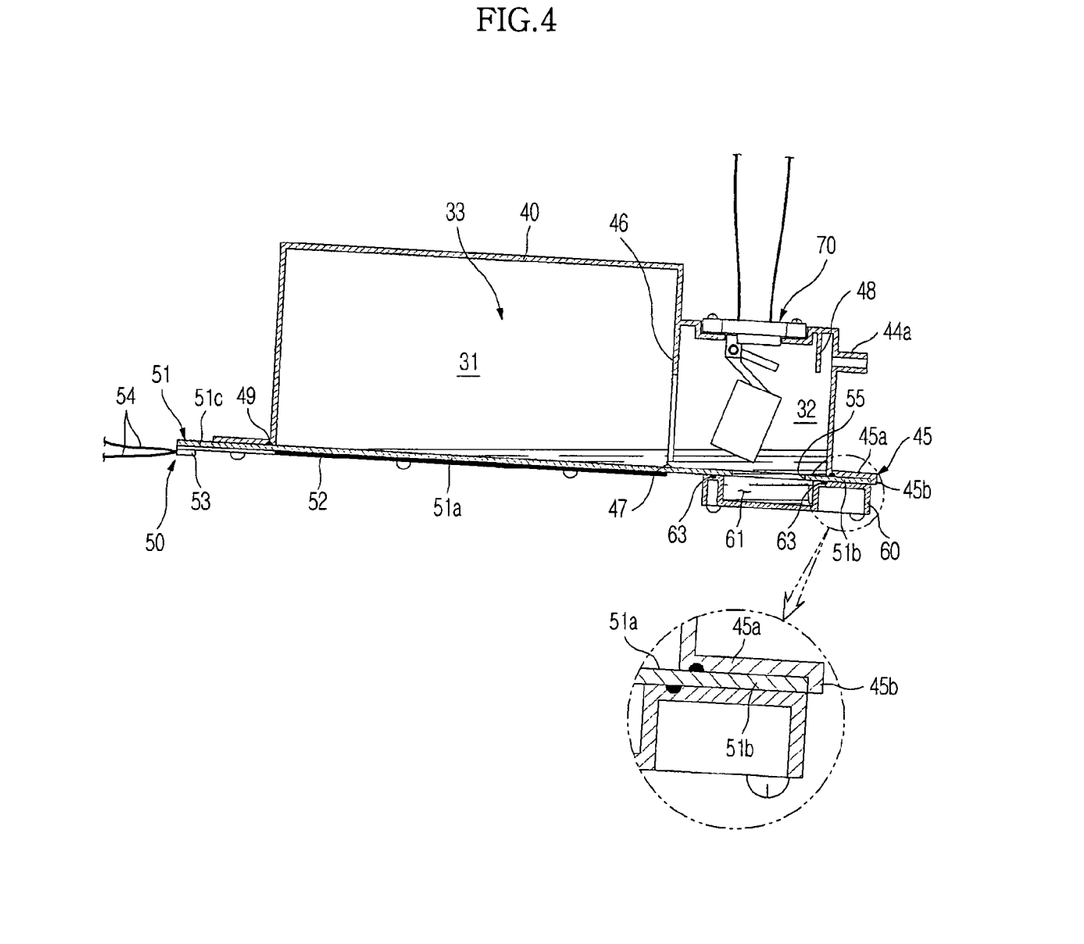
FIG. 4 is a sectional view showing the operation of the steam generator consistent with the embodiment of the present invention.

FIG. 1 is a perspective view schematically showing a heating cooking apparatus consistent with an embodiment of the present invention. FIG. 2 is a perspective view schematically showing a steam generator consistent with the embodiment of the present invention. FIG. 3 is a view showing a coupling structure between the steam generator and a body of the heating cooking apparatus consistent with the embodiment of the present invention. FIG. 4 is a sectional view showing the operation of the steam generator consistent with the embodiment of the present invention.

As shown in FIG. 1, the heating cooking apparatus 10 consistent with an embodiment of the present invention includes a body 12 internally having a cooking compartment 11, a cover 14 configured to cover an upper side, both lateral sides, and a rear side of the body 12, a convection heater 16 provided at either lateral side of the body 12 to heat the cooking compartment 11, a magnetron 17 to generate microwaves and oscillate the generated microwaves into the cooking compartment 11, and a steam generator 30 to generate steam and supply the generated steam into the cooking compartment 11.

The body 12 has an open front side for the entrance and exit of food. On the front side of the body 12 is provided a door 13 to open and close the cooking compartment 11 in which food is disposed. Between the body 12 and the cover 14 covering the body 12 is defined a space for the installation of various constituent elements of the cooking apparatus. A controller 15 is provided on the body 12 at a front position of the body 12 for the sake of manual operation by a user. A water supply device 20 to supply water into the steam generator 30 is also provided on the body 12 so that a water vessel 21 thereof is located at a side of the controller 15.

The water supply device 20 includes the water vessel 21 to store water therein, and a water supply pump 23 to move the water stored in the water vessel 21 into the steam generator 30. The water vessel 21 is inserted in a water vessel case 22 that is mounted on the body 12 so that the water vessel 21 is slidably extracted or inserted from or into the water vessel case 22 in a drawer type manner. The water supply pump 23 is connected to the water vessel 21 through a water supply tube 24 and also connected to the steam generator 30 through a water supply connection tube 25. A blower 19 is mounted on the body 12 at a side of the water supply device 20. The blower 19 is used to blow air, so as to cool several constituent elements disposed on the body 12.

The convection heater 16 provided at either lateral side of the body 12 and the magnetron 17 mounted on the body 12 at a rear position of the body 12 are well known in the art. The convection heater 16 and the magnetron 17 serve to cook food disposed in the cooking compartment 11 by supplying heat or microwaves into the cooking compartment 11. The convection heater 16 includes a heater (not shown) and a circulation fan (not shown) and is adapted to circulate air heated by the heater into the cooking compartment 11. The magnetron 17 is adapted to generate microwaves upon receiving a high voltage from a high-voltage transformer 18 and to transmit the generated microwaves into the cooking compartment 11 through a waveguide (not shown) that is coupled to a rear side of the cooking compartment 11.

The steam generator 30 is coupled to a supporting bracket 80 that is provided at an upper portion of the rear side of the body 12. The steam generator 30 is connected to the water supply device 20 and a drain device 90 to allow movement of water therebetween. As shown in FIGS. 2 and 4, the steam generator 30 includes a steam container 40, a steam heater 50 coupled to a lower end of the steam container 40, a drain guiding member 60 coupled to a lower side of the steam heater 50 at a position close to a lateral side of the steam heater 50, and a water level sensing unit 70 coupled to a side of the steam generator 30.

As shown in FIG. 2, the steam container 40, which internally defines a steam chamber 31 and a water level sensing chamber 32, is formed, at one side surface thereof, with a steam discharge portion 41 to discharge steam generated in the steam chamber 31 and a plurality of coupling members 42a, 42b, and 42c each having a screw hole 43 and, at another side surface thereof, with a water supply portion 44 to supply water into the water level sensing chamber 32. The steam discharge portion 41 includes at least one steam discharge pipe 41a protruded outward from the steam container 40. The steam discharge portion 41 is connected to at least one steam supply tube (not shown), so as to provide the cooking compartment 11 with steam generated in a steam chamber 31 that is defined in the steam container 40. The water supply portion 44 includes a water supply pipe 44a protruded outward from the steam container 40. The water supply portion 44 is connected to the water supply pump 23 through the water supply connection tube 25. The steam container 40 has a mounting recess 40a for the water level sensor 70. The mounting recess 40a is formed at an upper surface of the steam container 40 at a position close to a lateral side of the steam container 40.

The steam container 40 also has a heater covering portion 45 extended from a periphery of a lower end thereof. The heater covering portion 45 includes a horizontally extended top covering portion 45a and a rim covering portion 45b extended vertically from a periphery of the top covering portion 45a. As shown in FIG. 4, the heater covering portion 45 surrounds an outer rim of the steam heater 50, to prevent water at the outside of the steam generator 30 from coming into contact with the steam heater 50. The heater covering portion 45 is configured to surround the outer rim of the steam heater 50 except for a terminal connecting portion 51c provided at the outer rim of the steam heater 50.

As shown in FIG. 4, the steam container 40 has an inner chamber 33, which is divided into two parts by use of a partition 46. That is, the steam container 40 has the steam chamber 31 for generating steam and the water level sensing chamber 32. The water from the water supply pipe 44a is supplied into the water level sensing chamber 32. A water flow path 47 is defined between the steam chamber 31 and the water level sensing chamber 32, to allow the water supplied into the water level sensing chamber 32 to move into the steam chamber 31 through the flow path 47. The water level sensor 70 is installed in the water level sensing chamber 32 to sense the level of water in the water level sensing chamber 32. A shield rib 48 is also installed in the water level sensing chamber 32 at a position in front of the water supply pipe 44a, to prevent water supplied through the water supply pipe 44a from being injected suddenly toward the sensor 70 installed in the water level sensing chamber 32.

The steam heater 50, as shown in FIG. 2, is coupled to the lower end of the steam container 40 so that an outer periphery of the steam heater 50, except for a portion where a terminal 53 connected with a power line 54 for the supply of power is coupled thereto, is covered by the heater covering portion 45 of the steam container 40. The steam heater 50 includes a heating plate 51 configured to come into close contact with the steam container 40 and a heating element 52 coupled to a lower surface of the heating plate 51 and connected to the terminal 53.

The heating plate 51 has a chamber bottom forming portion 51a configured to cover the chamber 33 of the steam container 40, an extension 51b formed around a periphery of the chamber bottom forming portion 51a, and the terminal connecting portion 51c extended from a side of the extension 51b to be coupled to the terminal 53. If the heating plate 51 is coupled to the lower end of the steam container 40, an upper surface and a rim of the extension 51b are covered by the top covering portion 45a and the rim covering portion 45b of the heater covering portion 45, respectively, so as not to be exposed to the outside.

A sealing member 49 is interposed between the heating plate 51 and the steam container 40, to prevent leakage of water from the steam chamber 31 and the water level sensing chamber 32. The heating element 52 acts as a resistor adapted to generate heat if power is applied thereto. The heating element 52 is provided only in the chamber bottom forming portion 51a of the heating plate 51 and the remaining portion of the heating plate 51 located in the water level sensing chamber 32 has no heating element.

The drain guiding member 60 is coupled to the lower side of the steam heater 50 that is located below the water level sensing chamber 32. The drain guiding member 60 has a drain chamber 61, which is connected to the water level sensing chamber 32 through a drain hole 55 that is perforated in the heating plate 51 located below the water level sensing chamber 32 at a position close to the lateral side of the heating plate 51. The drain chamber 61 is connected to a drain pipe 62 that leads to the outside. The drain pipe 62 is connected to the drain device 90 that is coupled to the supporting bracket 80.

The drain device 90 includes a drain connection tube 91 connected to the drain pipe 62, a drain valve 92 to control a water drain operation, and a drain tube 93 connected to the drain valve 92 to discharge water moved through the drain connection tube 91. The drain valve 92 is secured to a valve supporting member 83 coupled to the supporting bracket 80. Thereby, the water in the water level sensing chamber 32 is discharged into the drain device 90 by passing through the drain hole 55, drain chamber 61, and drain pipe 62. A sealing member 63 is provided around a periphery of the drain chamber 61 between the drain guiding member 60 and the heating plate 51. The steam container 40, steam heater 50, and drain guiding member 60 are screwed to one another.

The steam generator 30 having the above described configuration is screwed to the supporting bracket 80 provided at the rear side of the body 12. As shown in FIGS. 2 and 3, the supporting bracket 80 has a plurality of coupling holes 82a, 82b, and 82c corresponding, respectively, to the plurality of coupling members 42a, 42b, and 42c. As a plurality of coupling screws S are inserted into the respective screw holes 43 of the coupling members 42a, 42b, and 42c through the coupling holes 82a, 82b, and 82c, the steam generator 30 is secured to the supporting bracket 80. In this case, the steam discharge pipe 41a is inserted into a through-hole 81 perforated in the supporting bracket 80, and the drain pipe 62 is inserted into the drain connection tube 91.

Of the plurality of coupling members 42a, 42b, and 42c provided at the steam container 40, the two lower coupling members 42b and 42c are located at the same height as each other from the lower end of the steam container 40. However, the coupling holes 82b and 82c of the supporting bracket 80 corresponding to the coupling members 42b and 42c are located at different heights from each other from a lower end of the supporting bracket 80. Accordingly, as shown in FIG. 3, an imaginary line C, which connects the two lower coupling holes 82b and 82c of the supporting bracket 80 to each other, is not parallel to a horizontal line B that is parallel to the ground surface, but has a predetermined angle A relative to the horizontal line B. Thereby, the steam generator 30 is tilted to have the predetermined angle A relative to the ground surface, and the terminal 53 at one side of the steam heater 50 is located higher than the drain hole 55 at the other opposite side of the steam heater 50.

When tilting the steam generator 30 so that one end of the heating plate 51, to which the power supply terminal 53 is coupled, is located higher than the other opposite end of the heating plate 51 having the drain hole 55, even if water is leaked from the steam chamber 31 or water level sensing chamber 32, the leaked water is moved in an opposite direction to that of the terminal 53, thus having no risk of coming into contact with the terminal 53. Also, since the outer periphery of the steam heater 50 except for a portion thereof where the terminal 53 is provided is covered by the heater covering portion 45 of the steam container 40, even if water is leaked from a variety of tubes or joints of the tubes, it is very difficult for the leaked water to come into contact with the steam heater 50. This has the effect of reducing the risk of power leakage.

Also, since the steam generator 30 is tilted so that the drain hole 55 is located lower than the remaining portion of the steam heater 50, the water in the steam chamber 31 and the water level sensing chamber 32 is moved to the drain hole 55, thus allowing a more efficient water drain operation.

The steam generator 30 preferably has a tilt angle of 5°, but may be tilted by different angles. The tilt angle of the steam generator 30 can be easily regulated by changing positions of the coupling holes 82*a*, 82*b*, and 82*c* provided in the supporting bracket 80.

In the present invention, to prevent the water leaked from the steam generator 40 from coming into contact with the terminal 53, the heating plate 51 may be bent so that the terminal 53 of the steam heater 50 is located higher than the chamber bottom forming portion 51*a* of the steam heater 50, or the steam heater 50 may be installed to the steam heater 40 to have a tilt angle so that the chamber bottom forming portion 51*a* is located lower than the remaining portion of the steam heater 50.

Hereinafter, operations of the steam generator 30 and the heating cooking apparatus 10 consistent with the embodiment of the present invention will be explained.

If a cooking operation begins, the water supply pump 23 is operated to supply water in the water vessel 21 into the water level sensing chamber 32 and the steam chamber 31 of the steam generator 30. Then, power is applied to the steam heater 50 so that the water introduced in the steam chamber 31 is heated by the steam heater 50. Thereby, steam is generated in the steam chamber 31. The generated steam is discharged through the steam discharge pipe 41*a*, to thereby be supplied into the cooking compartment 11 through the steam supply tube. In this case, if the convection heater 16 is operated, the temperature of the steam in the cooking compartment 11 is raised to a temperature sufficient to cook food disposed in the cooking compartment 11.

If the level of water in the steam chamber 31 and the steam sensing chamber 32 is lowered via evaporation of the water while the steam heater 50 is operated, the water level sensor 70 senses the lowering of the water level and generates a signal. Thereby, the water supply pump 23 is operated in response to the signal from the sensor 70, so as to supplement water into the steam chamber 31 and the water level sensing chamber 32.

If the cooking operation is completed, the supply of power to the steam heater 50 is intercepted and the drain valve 92 is opened to discharge the water in the steam chamber 31 and the water level sensing chamber 32 to the outside.

As apparent from the above description, the present invention provides a heating cooking apparatus in which a steam generator is coupled to a body of the heating cooking apparatus so that a terminal of a steam heater is located higher than the remaining portion. As a result, even if water is leaked from the steam generator, there is substantially no risk the leaked water coming into contact with the terminal. Further, according to the present invention, since a heater covering portion is provided at a steam container to cover an outer periphery of the steam heater except for the terminal, it is possible to efficiently prevent water at the outside of the steam generator from coming into contact with the steam heater. Accordingly, the present invention has the effect of reducing any dangerous power leakage accidents caused when water comes into contact with the steam heater.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A steam generator comprising:
    a steam container having a chamber with an open bottom at a lower end thereof, a water supply portion to supply water into the chamber, and a steam discharge portion to discharge steam generated in the chamber;
    a steam heater comprising a heating plate having a chamber bottom forming portion that is coupled to a lower end of the steam container so as to cover the open bottom of the chamber and adapted to heat the water supplied into the chamber; and
    a heater covering portion connected to the steam container and configured to cover a rim of the heating plate,
    wherein the heating plate has a drain hole perforated therein, and a drain guiding member having a drain pipe is coupled to a lower side of the heating plate, so as to allow the water passed through the drain hole to be discharged through the drain pipe.

2. The steam generator according to claim 1, wherein the heater covering portion is extended from the lower end of the steam container.

3. The steam generator according to claim 1, wherein the steam heater further comprises
    a heating element coupled to a lower surface of the heating plate and adapted to generate heat when electric power is applied thereto.

4. The steam generator according to claim 3, wherein:
    the heating plate comprises an extension formed around a periphery of the chamber bottom forming portion, and
    the heater covering portion comprises a top covering portion to cover an upper surface of the extension and a rim covering portion to cover a rim of the extension.

5. A steam generator comprising:
    a steam container having a chamber with an open bottom at a lower end thereof, a water supply portion to supply water into the chamber, and a steam discharge portion to discharge steam generated in the chamber into a cooking compartment; and
    a steam heater having a planar shape having a chamber bottom forming portion that is coupled to a lower end of the steam container so as to cover the open bottom of the chamber and adapted to heat the water supplied into the chamber and a terminal for the supply of power,
    wherein the chamber bottom forming portion of the steam heater is located lower than the terminal of the steam heater.

6. The steam generator according to claim 5, wherein the steam heater is installed to the steam container to have a tilt angle so that the chamber bottom forming portion is located lower than the terminal.

7. A heating cooking apparatus comprising:
    a body having a cooking compartment in which food is disposed; and
    a steam generator including:
        a steam container having a chamber with an open bottom at a lower end thereof;
        a water supply portion to supply water into the chamber;
        a steam discharge portion to discharge steam generated in the chamber into the cooking compartment; and a steam heater comprising a heating plate having a chamber bottom forming portion that is coupled to the lower end of the steam container and adapted to heat the water supplied into the chamber, wherein the steam generator is installed to the body to have a tilt angle so that an end of the steam heater having a power supply terminal is located higher than an opposite end of the steam heater which is lower than the power supply terminal, and the opposite end of the steam heater includes a drain hole.

8. The heating cooking apparatus according to claim 7, further comprising:

a heater covering portion configured to cover a rim of the heating plate.

9. The heating cooking apparatus according to claim 8, wherein the heater covering portion is extended from the lower end of the steam container.

10. The heating cooking apparatus according to claim 7, wherein:

the steam container comprises at least one coupling member protruded from a side surface thereof, and the steam generator is installed to the body to have the tilt angle as the coupling member is coupled to a side surface of the body.

11. The heating cooking apparatus according to claim 10, wherein:

the coupling member of the steam container has a screw hole into which a coupling screw is inserted, and the body has a coupling hole corresponding to the screw hole, whereby the steam generator is screwed to the body.

12. The heating cooking apparatus according to claim 7, wherein the tilt angle is approximately 5 degrees.

* * * * *

UNITED STATES PATENT AND TRADEMARK OFFICE
CERTIFICATE OF CORRECTION

| | | |
|---|---|---|
| PATENT NO. | : 7,989,737 B2 | Page 1 of 1 |
| APPLICATION NO. | : 11/808752 | |
| DATED | : August 2, 2011 | |
| INVENTOR(S) | : Ki Suk Jeon et al. | |

It is certified that error appears in the above-identified patent and that said Letters Patent is hereby corrected as shown below:

Title Page, Item (75) (Inventors), Line 4, Delete "(JP);" and insert -- (KR); --, therefor.

Signed and Sealed this
Twenty-eighth Day of February, 2012

David J. Kappos
*Director of the United States Patent and Trademark Office*